(12) United States Patent
Aoki et al.

(10) Patent No.: US 11,027,692 B2
(45) Date of Patent: Jun. 8, 2021

(54) AIR BAG DEVICE

(71) Applicant: HONDA MOTOR CO., LTD., Tokyo (JP)

(72) Inventors: Takashi Aoki, Wako (JP); Osamu Kanno, Wako (JP); Kenyu Okamura, Wako (JP); Masato Sasaki, Wako (JP); Hidetoshi Nakamura, Wako (JP); Masahiro Motoyoshi, Wako (JP); Atsushi Nakajima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 116 days.

(21) Appl. No.: 16/433,359

(22) Filed: Jun. 6, 2019

(65) Prior Publication Data
US 2019/0375367 A1    Dec. 12, 2019

(30) Foreign Application Priority Data

Jun. 8, 2018   (JP) .............................. JP2018-109997

(51) Int. Cl.
| | |
|---|---|
| *B60R 21/36* | (2011.01) |
| *B60R 21/264* | (2006.01) |
| *B60R 21/2338* | (2011.01) |
| *B60R 21/231* | (2011.01) |
| *B60R 21/34* | (2011.01) |
| *B60R 21/01* | (2006.01) |

(52) U.S. Cl.
CPC .......... *B60R 21/36* (2013.01); *B60R 21/2338* (2013.01); *B60R 21/264* (2013.01); *B60R 2021/01238* (2013.01); *B60R 2021/23107* (2013.01); *B60R 2021/346* (2013.01)

(58) Field of Classification Search
CPC ... B60R 21/36; B60R 2021/343; B60R 21/38; B60R 19/205
See application file for complete search history.

(56) References Cited

U.S. PATENT DOCUMENTS

| 6,923,483 | B2 * | 8/2005 | Curry ................... B60R 19/205 |
|---|---|---|---|
| | | | 180/274 |
| 7,000,725 | B2 * | 2/2006 | Sato .................... B60R 21/2338 |
| | | | 180/274 |
| 7,073,619 | B2 * | 7/2006 | Alexander .......... B60R 21/2338 |
| | | | 180/274 |
| 7,836,996 | B2 * | 11/2010 | Kitte ....................... B60R 21/36 |
| | | | 180/271 |
| 8,408,350 | B2 * | 4/2013 | Wilmot .................. B60R 21/36 |
| | | | 180/274 |

(Continued)

FOREIGN PATENT DOCUMENTS

| EP | 2492156 A1 * | 8/2012 | ............. B60R 21/36 |
|---|---|---|---|
| EP | 2502794 A1 * | 9/2012 | ............. B60R 21/36 |
| JP | 2000-168473 A | 6/2000 | |

*Primary Examiner* — Paul N Dickson
*Assistant Examiner* — Matthew D Lee
(74) *Attorney, Agent, or Firm* — Rankin, Hill & Clark LLP (57) ABSTRACT

An air bag device has an inflator and a bag unit configured to be deployed on a front part of a vehicle body with a gas supplied from the inflator. The bag unit includes a first bag, a second bag, and a connector, which are annularly connected to one another, and when the bag unit is deployed, the first bag and the second bag are erected on the vehicle body into a mountain-like shape in such a way that the bag unit forms a substantially triangular shape as a whole.

10 Claims, 11 Drawing Sheets

(56) References Cited

U.S. PATENT DOCUMENTS

| | | | |
|---|---|---|---|
| 9,650,014 B2* | 5/2017 | Suemune | B60R 21/2338 |
| 2006/0197319 A1* | 9/2006 | Nakamura | B60R 21/36 |
| | | | 280/729 |
| 2009/0289471 A1* | 11/2009 | Finney | B60R 19/40 |
| | | | 296/187.04 |
| 2020/0062202 A1* | 2/2020 | Umezawa | B60R 21/36 |

\* cited by examiner

AIR BAG DEVICE

CROSS-REFERENCE TO RELATED APPLICATIONS

The present application claims priority under 35 U.S.C. § 119 to Japanese Patent Application No. 2018-109997, filed on Jun. 8, 2018, the contents of which are hereby incorporated by reference in their entirety.

BACKGROUND OF THE INVENTION

1. Field of the Invention

The present invention relates to an air bag device to protect a protection target such as a pedestrian.

2. Description of the Related Art

A known example of such an air bag device is the one disclosed in Japanese Patent Application Publication No. 2000-168473 (Patent Document 1).

According to Patent Document 1, the air bag device includes an air bag that is inflated upon detection or prediction of a collision with a protection target and is deployed over a range of a vehicle body from an upper surface of a bumper to a front end portion of a hood. This air bag absorbs and reduces an impact on the protection target in case of a collision.

SUMMARY OF THE INVENTION

The air bag device of Patent Document 1 adopts an air bag constituted by a single bag. For this reason, it is likely that the deployed bag deflates as a whole due to the impact in the event of collision with the protection target. Therefore, this air bag device has a problem in retaining the shape of the deployed air bag and a difficulty in properly absorbing the impact on the protection target.

The air bag device also has a difficulty in restraining the protection target having been knocked up onto the hood from slipping off from a front end thereof.

The present invention has been made in view of the aforementioned circumstances. An object of the invention is to provide an air bag device which is excellent in retaining the shape of the deployed bags thereof and is capable of appropriately absorbing an impact in case of a collision with a protection target and restraining the protection target having been knocked up onto a hood from slipping off the hood from a front end thereof.

To attain the object, an air bag device according to the present invention includes an inflator and a bag unit configured to be deployed on a front part of a vehicle body with a gas supplied from the inflator. The bag unit includes a first bag, a second bag, and a connector, which are annularly connected to one another, and when the bag unit is deployed, the first bag and the second bag are erected on the vehicle body into a mountain-like shape in such a way that the bag unit forms a substantially triangular shape as a whole.

According to the present invention, it is possible to provide an air bag device which is excellent in retaining the shape of the deployed bags thereof and is capable of appropriately absorbing an impact in case of a collision with a protection target and restraining the protection target having been knocked up onto a hood of the vehicle body from slipping off the hood from a front end thereof.

DETAILED DESCRIPTION OF THE EMBODIMENTS

Embodiments of the present invention will be hereinafter described in detail with reference to the drawings as appropriate. In the following, the same constituent elements are denoted by the same reference signs and duplicate explanations thereof will be omitted. When directions are explained, front-rear, right-left, and up-down directions will be described based on the viewpoint from a driver.

First Embodiment

Figure 1:
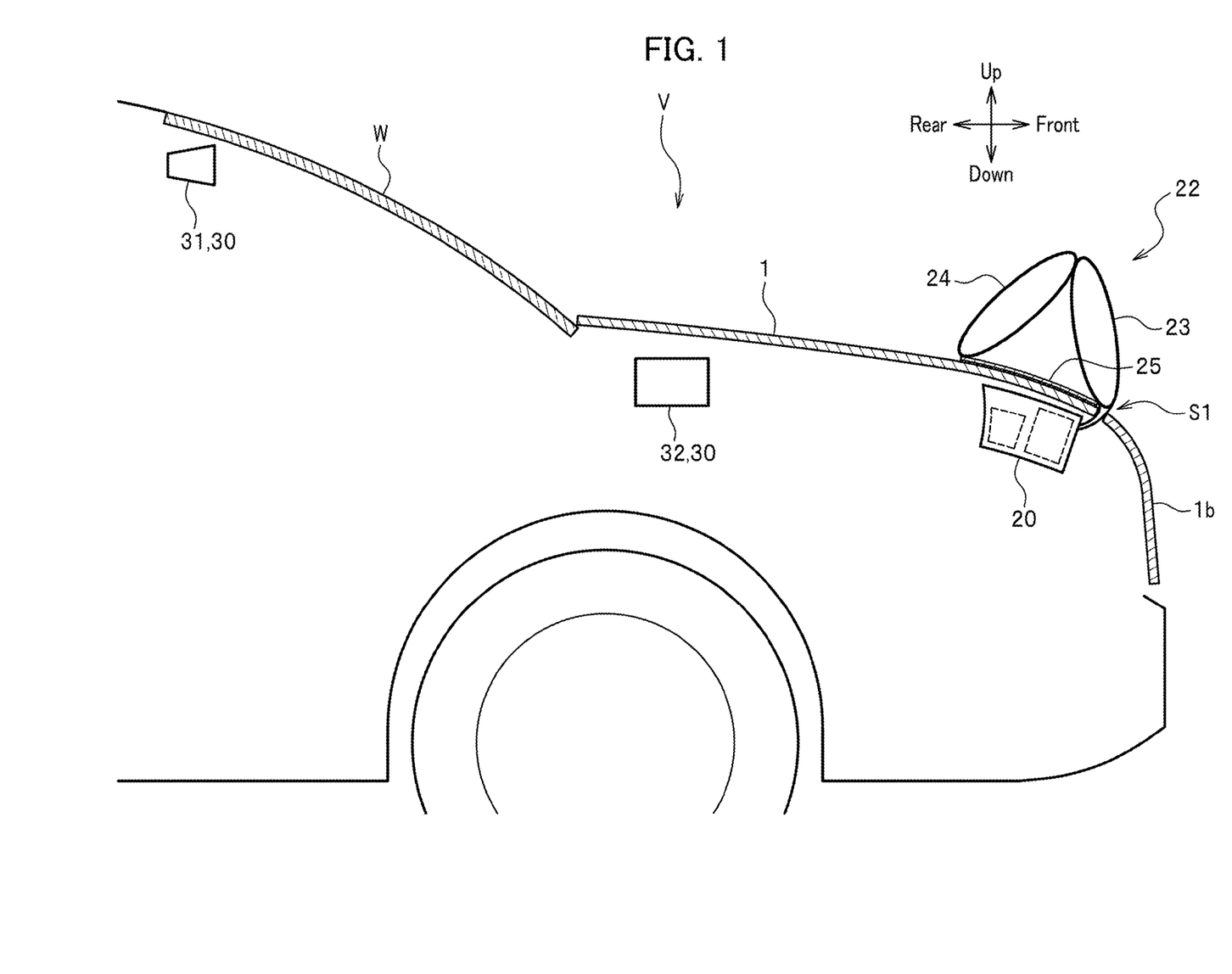
FIG. 1 is a partially cross-sectional side view of a front part of a vehicle body, showing a state in which a bag unit of an air bag device according to a first embodiment of the present invention has been deployed.

As shown in FIG. 1, an automobile V provided with an air bag device according to the present embodiment has a hood 1 provided at a front part of a vehicle body and covering an engine room. Provided below a front end portion of the hood 1 is an air bag device 20. The air bag device 20 is configured to absorb an impact on a protection target such as a pedestrian or the like (including a person on a bicycle or the like; hereinafter simply referred to as "pedestrian") in the event of collision between the pedestrian and the automobile V.

Figure 2:
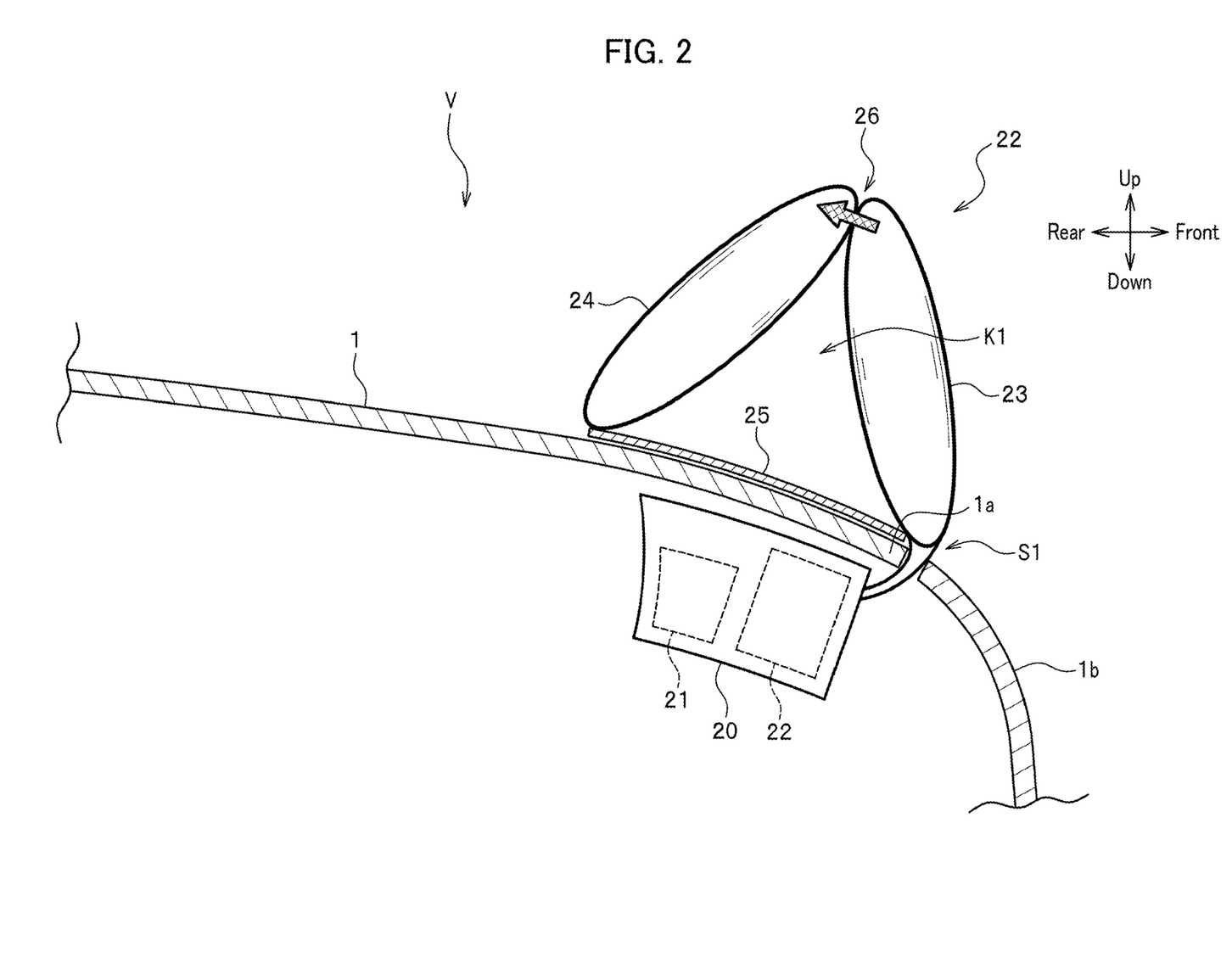
FIG. 2 is an enlarged partially cross-sectional side view showing the deployed bag unit.

As shown in FIG. 2, the air bag device 20 has an inflator 21 and a bag unit 22 to be deployed as an air bag. The bag unit 22 is folded and stored in the air bag device 20. Here, a single bag unit 22 may be configured to be deployed on the hood 1. Alternatively, multiple bag units 22 may be configured to be deployed on right and left sides of the hood 1 or may be configured to be deployed on the hood 1 as well as on right and left fenders (not shown) of the vehicle body. The bag unit 22 may have a laterally elongated shape extending in the right-left direction of the vehicle body.

The inflator 21 is a member to eject a gas into the bag unit 22. The inflator 21 is of the pyrotechnic type that uses a gas-forming agent. The inflator 21 is activated in response to an instruction signal from a later-described collision detection device 30 and ejects the gas.

When two or more bag units 22 are provided, two or more inflators 21 may be correspondingly installed. When the bag unit 22 has a laterally elongated shape extending in the right-left direction of the vehicle body, two or more inflators 21 may be accordingly installed in the right-left direction.

Note that the air bag device 20 includes not-illustrated controllers each for controlling the activation of the corresponding inflator 21 and the amount of the gas to be ejected from the inflator 21. Each controller is connected with a control unit 32 (see FIG. 1), which is included in the collision detection device 30. The controller controls the activation of the inflator 21 and the amount of the gas to be ejected according to signals sent from the control unit 32. Details of the collision detection device 30 will be described later.

Here, the inflator 21 may be of, in place of the pyrotechnic type, another type such as the hybrid type, which is configured to eject an inflation gas by breaking a bulkhead of a high-pressure gas cylinder filled with a high-pressure inflation gas with gunpowder or the like.

As shown in FIG. 2, the bag unit(s) 22 is deployed on the hood 1 or on the right and left fenders through a gap S1 defined between a front end portion 1a of the hood 1 and a grill 1b. In order for the gap S1 to be of an appropriate size, an upper end portion or the like of the grill 1b may have a weakened portion that is broken off due to the pressure imposed in the event of the deployment of the bag unit 22, or may have a window-like portion that opens due to the pressure imposed in the event of the deployment of the bag unit 22. By providing the weakened portion and/or the window-like portion, the bag unit 22 can be deployed more smoothly.

The bag unit 22 includes a first bag 23, a second bag 24, and a tether 25 serving as a connector, which are connected to one another in an annular form. When the bag unit 22 has been deployed, it is erected on the vehicle body in a mountain-like shape with a connection portion 26 connecting between the first bag 23 and the second bag 24 being as a peak, and takes on a substantially triangular shape as a whole when viewed from a lateral side of the vehicle body.

Each of the first bag 23 and the second bag 24 has a substantially ellipsoidal cross section when viewed from the lateral side of the vehicle body, and is inflated with the gas flowing therein from the inflator 21. The first bag 23 is located on a front side of the vehicle body and the second bag 24 is located on a rear side of the first bag 23. A front surface of the first bag 23 faces forward of the vehicle body and is erected on the vehicle body so as to face a pedestrian. On the other hand, a rear surface of the second bag 24 faces the rear of the vehicle body and is erected on the vehicle body so as to be able to face the pedestrian having been knocked up onto the hood 1.

Figure 3:
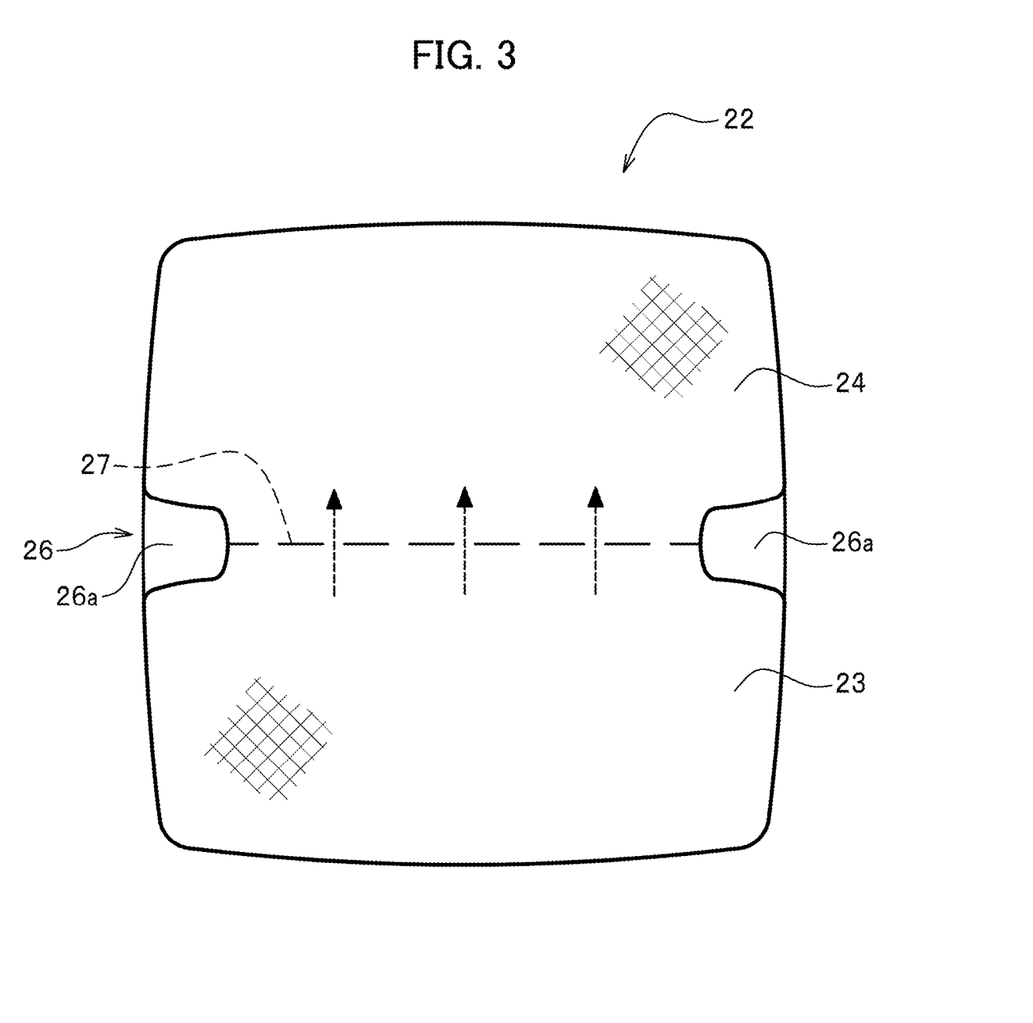
FIG. 3 is an enlarged schematic plan view of a first bag and a second bag before deployment.

As shown in FIG. 3, the first bag 23 and the second bag 24 collectively take on a substantially square shape in plan view before the gas flows therein. Internal spaces of the first bag 23 and the second bag 24 communicate with each other via the connection portion 26. In other words, the gas supplied from the inflator 21 flows into the first bag 23 and inflates the first bag 23, and then flows into the second bag 24 through the connection portion 26 and inflates the second bag 24. A seam 27 serving as a starting point of a crease of the mountain-like shape is formed on the connection portion 26. Even in the case where the seam 27 is not provided, recesses (relief portions) 26a into which the gas does not flow may be provided on right and left end portions of the connection portion 26 so as to define the starting point of the crease of the mountain-like shape. Moreover, it is possible to divide the flow of the gas from the first bag 23 to the second bag 24 in the middle by providing the connection portion 26 with the seam 27, a tether, and the like. This makes it possible to adjust the flow rate of the gas as well.

The connection portion 26 may be provided with a one-way valve to allow the gas to flow only in the direction from the first bag 23 to the second bag 24. The one-way valve makes it possible to retain the second bag 24 in an inflated form, thereby improving retention of the shape of the second bag 24 and eventually retention of the shape of the bag unit 22 as a whole.

As shown in FIG. 2, the tether 25 extends in the front-rear direction on the vehicle body and connects between a lower end portion of the first bag 23 and a lower end portion of the second bag 24. The tether 25 serves as a bottom portion of the bag unit 22, covers at least a portion of the hood 1 and a portions of either of the fenders, and is capable of coming into abutment with these portions. The length of the tether 25 as measured in the front-rear direction is shorter than a length that is obtained by adding the length of the major axis of the substantially ellipsoidal cross section of the first bag 23 to the length of the major axis of the substantially ellipsoidal cross section of the second bag 24.

A substantially triangular-shaped space K1 is defined by being surrounded by an inner surface of the first bag 23, an inner surface of the second bag 24, and an inner surface of the tether 25, on an inner side of the bag unit 22. The space K1 can function as a space to absorb an impact while allowing deformation of the first bag 23 and the second bag 24, and can also function as a holding space that allows insertion of an arm or a leg of the pedestrian and holds the arm or the leg inserted thereto.

Next, a description will be given of the collision detection device 30. As shown in FIG. 1, the collision detection device 30 includes: a camera 31 as a detection device viewing forward and through a front windshield W; and the control unit 32 as a controller disposed at an appropriate place inside the engine room or the like.

This camera 31 is an infrared camera. However, the camera 31 may instead be a publicly known camera designed for ordinary shooting. The camera 31 captures images of the scene ahead of the vehicle body over the hood 1 to detect the situation in front of the vehicle body. The camera 31 may be a camera used for an advanced driver assistance system to assist a driver in performing driving operations. The advanced driver assistance system is a system developed in order to automate, adapt, and strengthen a vehicle system for safer and better driving.

The control unit 32 receives shot image data from the camera 31 and predicts whether or not there is a pedestrian who may possibly approach and collide with the front end portion 1a of the hood 1 of the automobile V that is traveling. The control unit 32 predicts whether or not there is a pedestrian who may possibly collide with the front end portion 1a of the hood 1 by calculating the change in size (area) of a pedestrian in the captured images at remote and close positions in front of the hood 1 at predetermined time intervals, for example.

When the control unit 32 predicts that there is a pedestrian who may possibly collide with the front end portion 1a of the hood 1, the control unit 32 transmits an activation signal to the inflator 21.

Next, a description will be given of an operation in the event of a collision of the pedestrian with the front end portion of the vehicle body.

First of all, when the automobile V is made drivable by turning on the ignition and the like, the camera 31 of the collision detection device 30 starts capturing images of the scene ahead of the vehicle body and the control unit 32 receives the image data shot by the camera 31. On the basis of the received shot image data, the control unit 32 starts the prediction as to whether or not there is a pedestrian who may possibly collide with the front end portion of the hood 1.

When the control unit 32 predicts that there exists a pedestrian who may possibly collide with the front end portion of the hood 1, the control unit 32 transmits an activation signal to the inflator 21. Then, the inflator 21 is activated and the bag unit 22 is deployed from the air bag device 20 via the gap S1 onto the hood 1 and the like. In this case, the gas supplied from the inflator 21 flows into the first bag 23, and the first bag 23 is erected on the hood 1 and the like.

Then, the gas flows from the first bag 23 into the second bag 24 via the connection portion 26. Thus, the second bag 24 is inflated and the first bag 23 and the second bag 24 are erected into a mountain-like shape with the connection portion 26 being located at a peak of the mountain-like shape. In the meantime, as a consequence of the inflation of the first bag 23 and the second bag 24, the tether 25 is pulled in the front-rear direction and comes into abutment with the hood 1 and the like. In this way, the bag unit 22 is deployed on the hood 1 and the like with the front surface of the first bag 23 facing the pedestrian.

Thereafter, when the pedestrian collides with the front end portion of the vehicle body, the first bag 23 of the bag unit 22 can receive the colliding pedestrian. Thus, the impact on the pedestrian can be appropriately absorbed by the deformation of the first bag 23. In this case, the first bag 23 is erected from the front end portion of the hood 1 of the vehicle body and is therefore capable of receiving a waist of the pedestrian, which waist is near the center of gravity of the pedestrian. Accordingly, the first bag 23 can absorb the impact on the pedestrian in the event of collision.

In this case, a rear side of the first bag 23 is supported by the second bag 24 erected on the hood 1 and the like. Thus, the first bag 23 is excellent in retaining its shape and is capable of absorbing the impact on the pedestrian effectively. In addition, when the first bag 23 is deformed, the second bag 24 is also deformed in conjunction therewith whereby the impact on the pedestrian is appropriately absorbed. After that, the pedestrian is knocked up onto the hood 1 with the impact on the pedestrian being absorbed, and is held thereon.

After that, when the pedestrian having been knocked up onto the hood 1 slips toward the front end portion 1a, a leg or the like of the pedestrian comes into abutment with the rear surface of the second bag 24. As a result, the second bag 24 can prevent the pedestrian from falling off the hood 1 from the front end portion 1a thereof.

In the case where multiple bag units 22 are deployed on the right and left of the hood 1 and the like, the control unit 32 may be configured to predict a collision position and deploy any of the bag units 22 earlier which is located closer to the predicted collision position.

In this case, when the control unit 32 predicts that there exist a pedestrian who may possibly collide with the front end portion 1a of the hood 1, the control unit 32 further predicts the collision position by computing which portion of the front end portion 1a of the hood 1 with respect to the right-left direction the pedestrian is likely to collide.

Next, the control unit 32 transmits an activation signal to the inflator 21 that corresponds to the predicted collision position. For example, when the predicted collision position is at a central portion of the hood 1, the control unit 32 transmits an activation signal to a corresponding inflator 21 located at the central portion and subsequently transmits activation signals to an inflator 21 on the left side and an inflator 21 on the right side. When the predicted collision position is on the left side of the hood 1, the control unit 32 transmits an activation signal to the corresponding inflator 21 on the left side and subsequently transmits activation signals to the inflator 21 located at the central portion and the inflator 21 located on the right side. When the predicted collision position is on the right side of the hood 1, the control unit 32 transmits an activation signal to the corresponding inflator 21 located on the right side and subsequently transmits activation signals to the inflator 21 located at the central portion and the inflator 21 located on the left side.

The above-described configuration makes it possible to deploy the multiple bag units 22 appropriately following the movement of the pedestrian after the collision, thereby effectively absorbing the impact on the pedestrian.

The above-described air bag device of this embodiment can receive the pedestrian colliding with the vehicle body by using the bag unit 22 that forms a substantially triangular shape as a whole with the first bag 23 and the second bag 24 being erected on the vehicle body in a mountain-like shape. Thus, the impact on the pedestrian can be appropriately absorbed by the deformation of the first bag 23 and the second bag 24. As the bag unit 22 forms the substantially triangular shape as a whole, the bag unit 22 is excellent in retaining its shape against the impact and capable of appropriately absorbing the impact on the pedestrian. Moreover, as the bag unit 22 is deployed starting from the front end portion 1a of the hood 1 that is located at the front end portion of the vehicle body, the bag unit 22 can receive a waist of the pedestrian colliding with the vehicle body, which waist is near the center of gravity of the pedestrian, thereby effectively absorbing the impact on the pedestrian.

Here, when the bag unit 22 hits around the waist of the pedestrian, the impact on the pedestrian is appropriately absorbed and the pedestrian gets pushed by a pop-up hood and the like and thus moves forward. Accordingly, velocities of the vehicle body and the pedestrian become close to each other whereby the pedestrian is less likely to be bounced back.

In addition, the rear surface of the second bag 24 of the bag unit 22 faces the rear of the vehicle body and is erected so as to be able to face the pedestrian having been knocked up onto the hood 1. Accordingly, when the pedestrian having been knocked up onto the hood 1 slips toward the front end portion 1a, a leg or the like of the pedestrian comes into abutment with the rear surface of the second bag 24. As a result, the second bag 24 can prevent the pedestrian from falling off the hood 1 from a front end thereof. In this way, it is possible to avoid the pedestrian from falling down on the ground and encountering a secondary collision. As a consequence, the pedestrian can be appropriately protected.

As the first bag 23 is connected to the second bag 24 with the tether 25, the tether 25 easily comes into abutment with upper surfaces of the hood 1 and the right and left fenders. Thus, the retention of the shape of the bag unit 22 is enhanced. As a consequence, it is possible to appropriately absorb the impact on the pedestrian.

Moreover, as the first bag 23 is connected to the second bag 24 with the tether 25, it is possible to simplify the structure of the bag unit 22 and to reduce the amount of the gas to be ejected from the inflator 21 while retaining the shape of the bag unit 22.

Moreover, the seam 27 is formed on the connection portion 26 between the first bag 23 and the second bag 24. Accordingly, when the first bag 23 and the second bag 24 are inflated with the gas from the inflator 21, the connection portion 26 is bent with the seam 27 serving as the starting point to form the mountain-like shape. As a consequence, the retention of the shape of the bag unit 22 is enhanced. In addition, the seam 27 can divide the flow of the gas from the first bag 23 to the second bag 24 in the middle and thus adjust the flow rate of the gas.

Moreover, since the collision detection device 30 is provided, it is possible to predict a collision of the pedestrian by using the camera 31 and to deploy the bag unit 22 from the air bag device 20 before the collision. In this way, it is possible to absorb the impact on the pedestrian reliably.

Second Embodiment

An air bag device of a second embodiment will be described with reference to FIGS. 4A and 4B. This embodiment is different from the above-described first embodiment in that the bag unit 22 is provided in a pivotable manner.

Figure 4A:
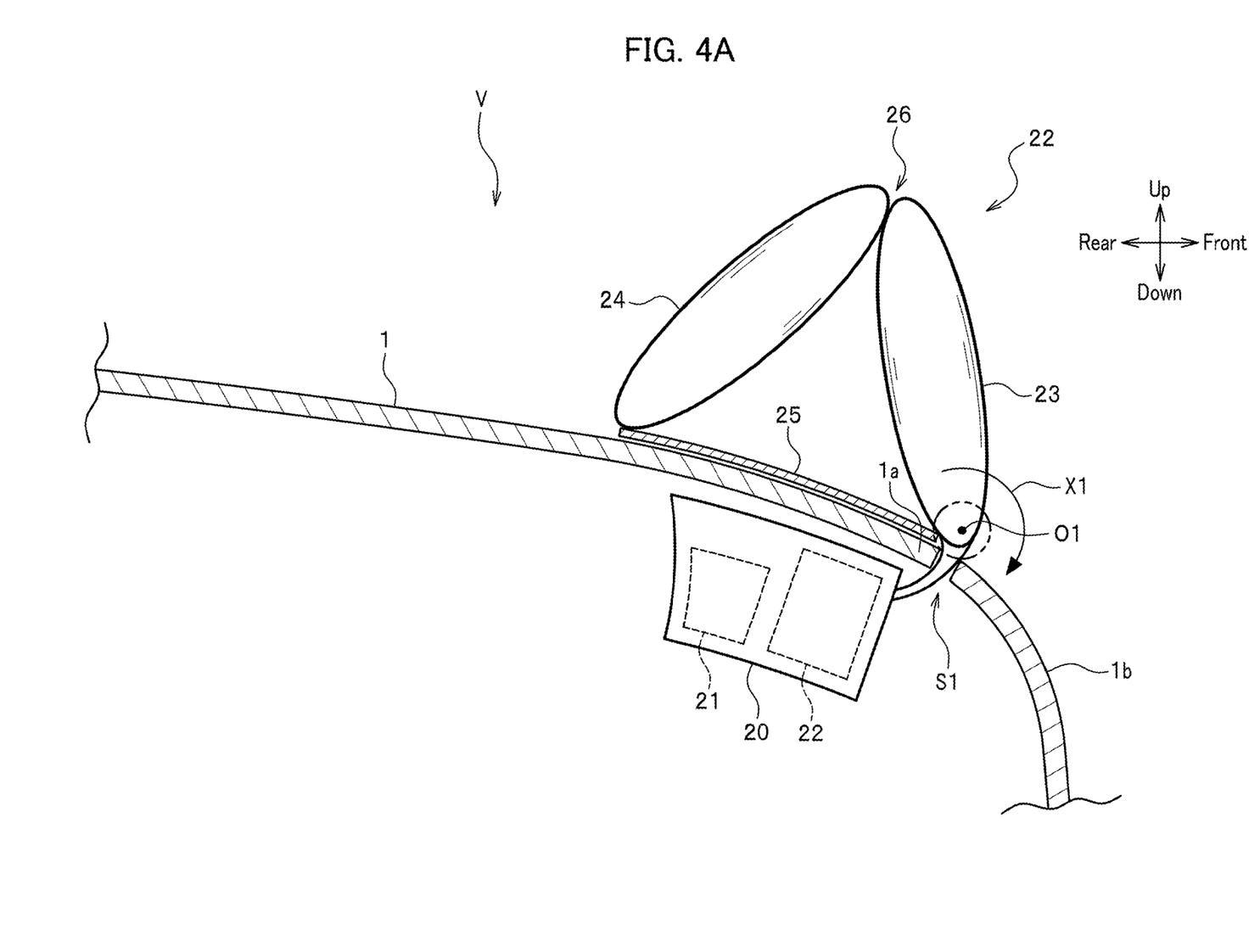
FIG. 4A is an enlarged partially cross-sectional side view showing a state in which a bag unit of an air bag device according to a second embodiment of the present invention has been deployed.

As shown in FIG. 4A, the bag unit 22 is provided with a pivot fulcrum O1 at the lower end portion of the first bag 23 and is configured to be pivotable about the pivot fulcrum O1 in the direction indicated by the arrow X1 shown in FIG. 4A, which is a direction toward the front of the vehicle body. A not-illustrated core member or the like serving as a pivot center is arranged at the pivot fulcrum O1. Incidentally, the bag unit 22 may be configured to be pivotable toward the front side of the vehicle body without arranging the core member but instead by using a tapered portion or the like formed on the lower end portion of the first bag 23.

The air bag device 20 provided with the above-described bag unit 22 operates as described below.

The rear surface of the second bag 24 of the bag unit 22 faces the rear of the vehicle body and is erected so as to be able to face the pedestrian having been knocked up onto the hood 1. Accordingly, when the pedestrian having been knocked up onto the hood 1 after the collision slips toward the front end portion 1a, a leg or the like of the pedestrian comes into abutment with the rear surface of the second bag 24. Thus, the second bag 24 restrains the pedestrian from falling off the hood 1 from a front end thereof.

Figure 4B:
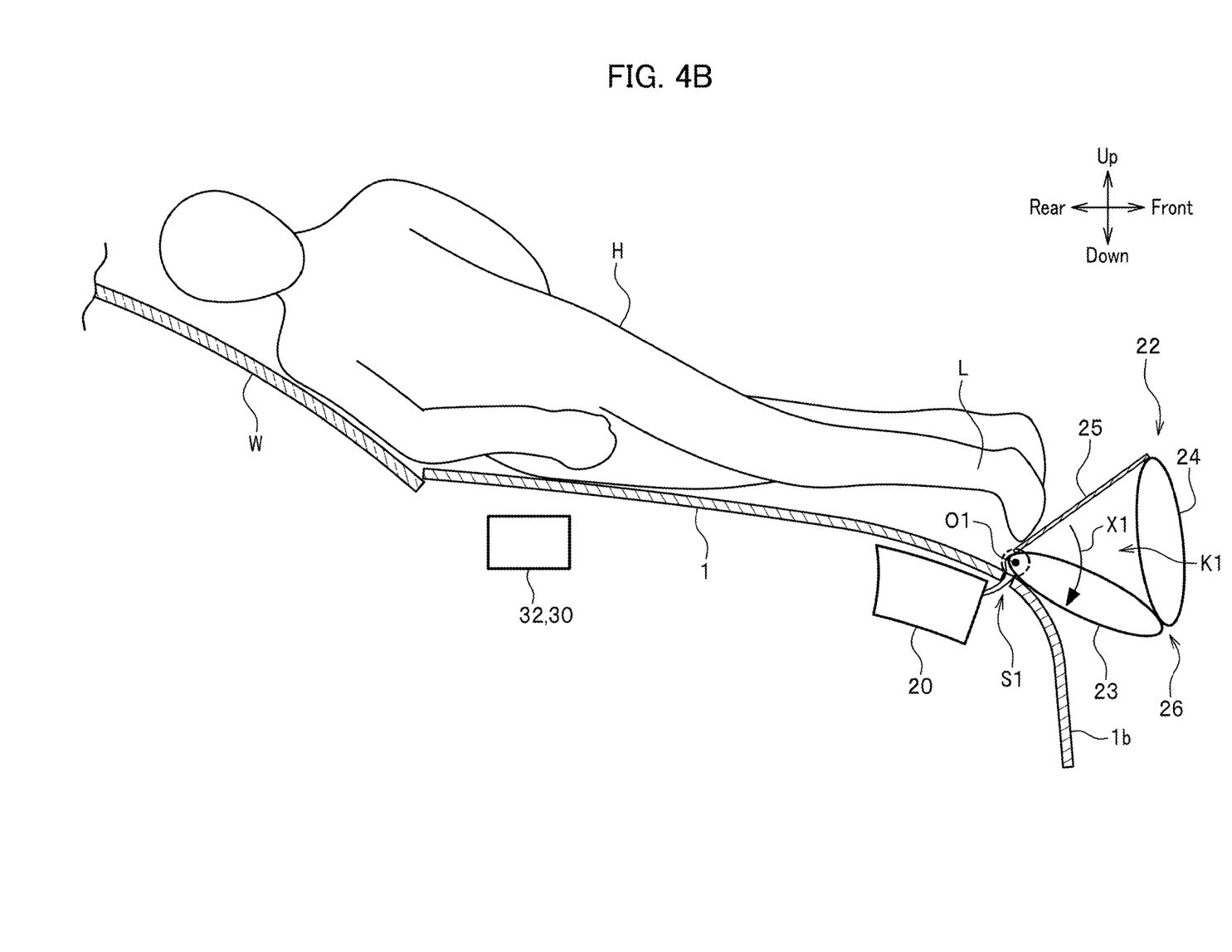
FIG. 4B is an operation explanatory diagram of the air bag device according to the second embodiment of the present invention.

Thereafter, when the rear surface of the second bag 24 is further pressed by a leg L or the like of such a pedestrian H as shown in FIG. 4B, the bag unit 22 is pivoted forward about the pivot fulcrum O1 by receiving the pressure. As a consequence of this pivoting, the tether 25, which together with the inner surface of the first bag 23 and the inner surface of the second bag 24 define the substantially triangular-shaped space K1 in a surrounding manner and defines a side surface thereof, faces the pedestrian H.

As a result, the leg L or the like of the pedestrian H can come into abutment with the tether 25 and get held by the tether 25, and the tether 25 can be curved forward at the same time. As a result, the leg L or the like can be housed and held in the space K1. Therefore, the pedestrian H can be prevented from falling off the vehicle body from a front end thereof.

According to this embodiment, the bag unit 22 that is pivotable toward the front side of the vehicle body prevents the pedestrian H from slipping forward of the vehicle body, and thus can avoid the pedestrian from falling down on the ground and encountering a secondary collision. As a consequence, the pedestrian H can be appropriately protected.

Third Embodiment

Figure 5:
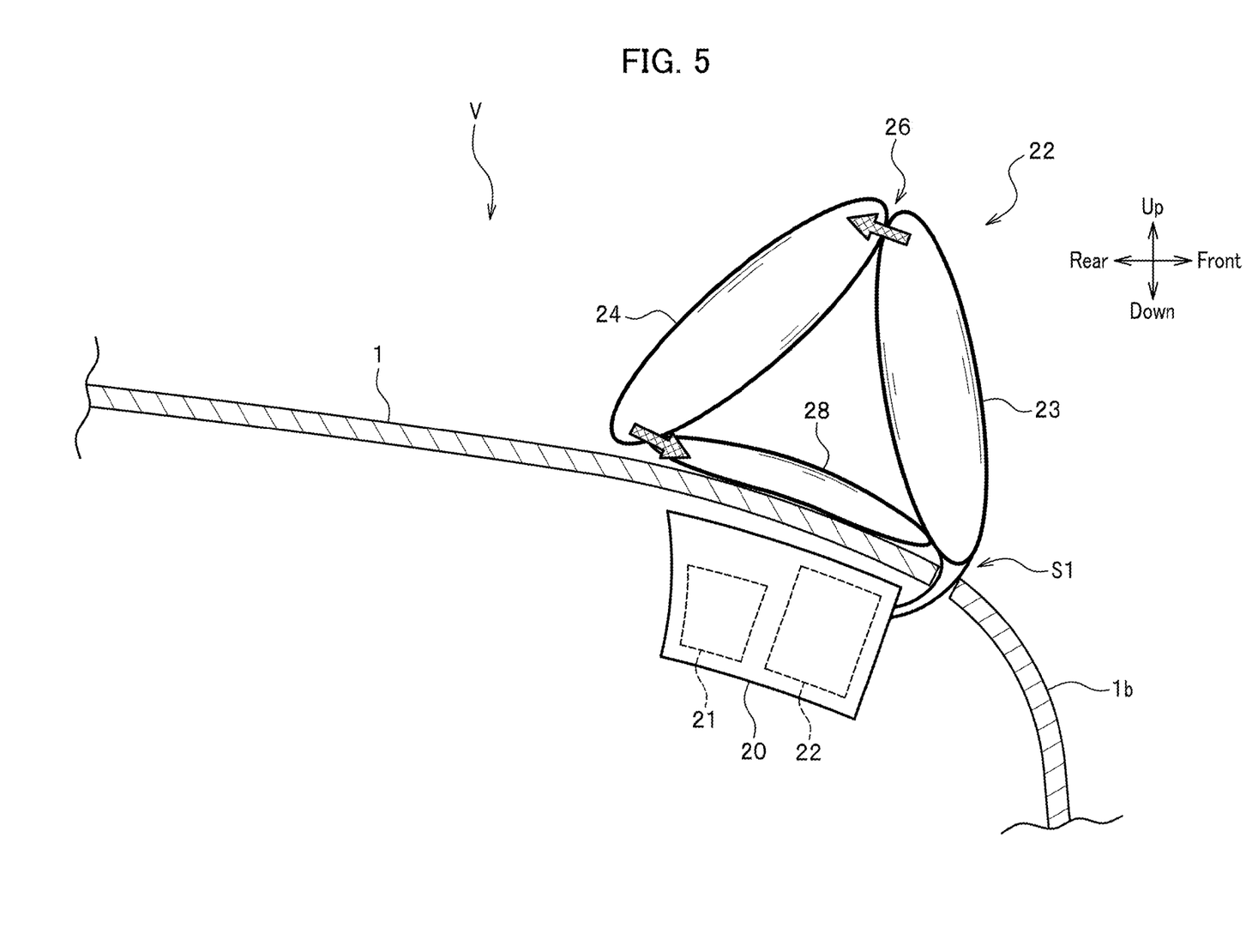
FIG. 5 is an enlarged partially cross-sectional side view showing a state in which a bag unit of an air bag device according to a third embodiment of the present invention has been deployed.

An air bag device of a third embodiment will be described with reference to FIG. 5. This embodiment is different from the above-described first and second embodiments in that a third bag 28 is provided in place of the tether 25.

The third bag 28 has a thin and substantially ellipsoidal cross-section. A front end portion of the third bag 28 is connected to the lower end portion of the first bag 23 and a rear end portion of the third bag 28 is connected to the lower end portion of the second bag 24. An internal space of the third bag 28 communicates with the internal space of the second bag 24 through the rear end portion. With this structure, the third bag 28 is inflated with the gas that flows from the second bag 24 into the third bag 28.

According to this embodiment, as the third bag 28 is provided, it is possible to absorb the impact on the pedestrian more appropriately than the embodiments provided with the tether 25.

Fourth Embodiment

An air bag device of a fourth embodiment will be described with reference to FIGS. 6A and 6B. This embodiment is a modification of the third embodiment, in which the bag unit 22 is provided in a pivotable manner.

Figure 6A:
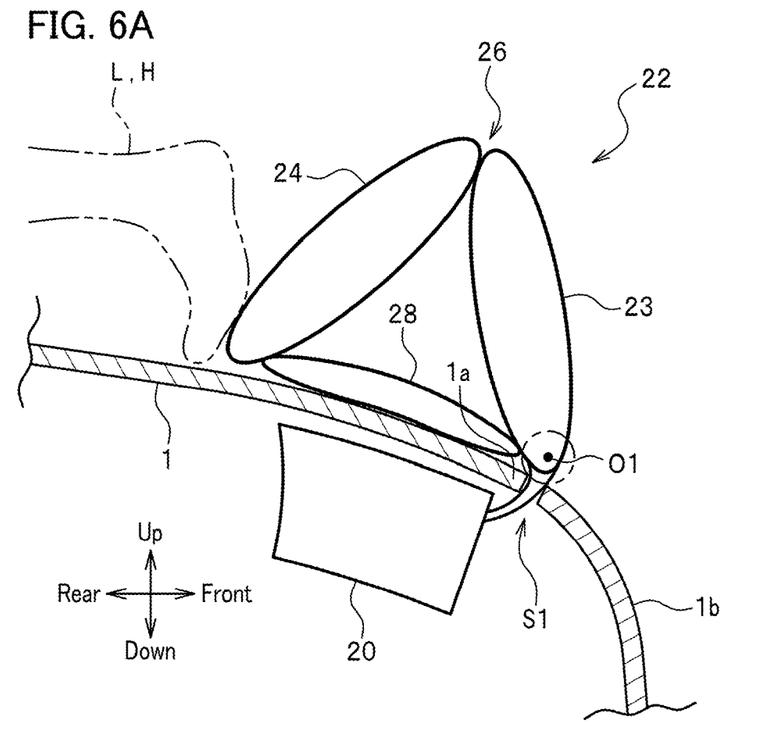
FIG. 6A is an enlarged partially cross-sectional side view showing a state in which a bag unit of an air bag device according to a fourth embodiment of the present invention has been deployed.
Figure 6B:
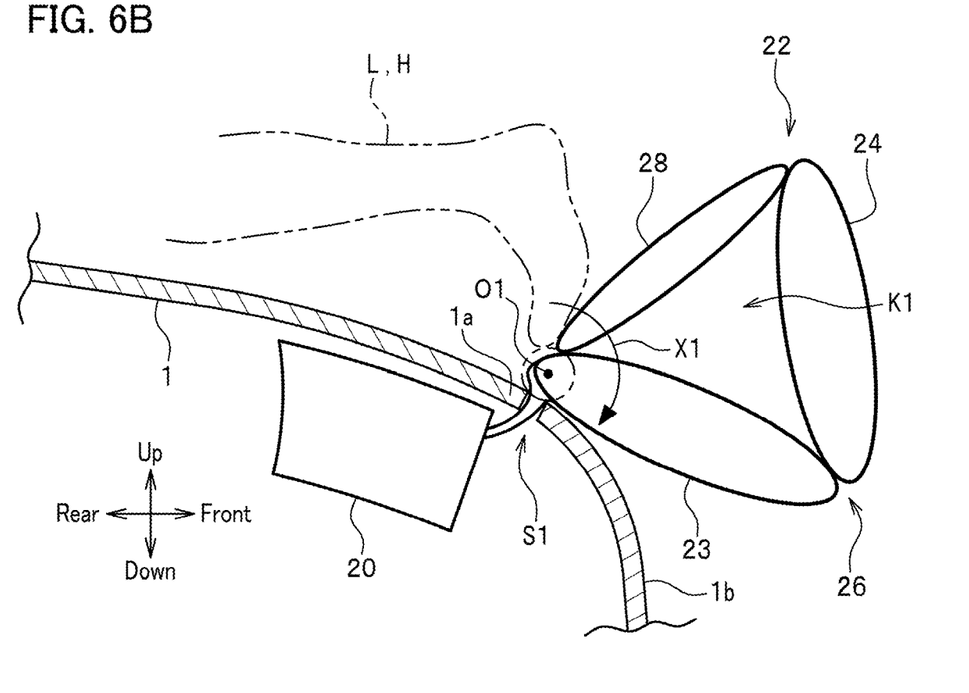
FIG. 6B is an operation explanatory diagram of the air bag device according to the fourth embodiment of the present invention.

As shown in FIG. 6A, the bag unit 22 is provided with a pivot fulcrum O1 at the lower end portion of the first bag 23 and is configured to be pivotable about the pivot fulcrum O1 toward the front of the vehicle body.

According to the above-described air bag device 20, when the rear surface of the second bag 24 is pressed by the leg L or the like of the pedestrian H having been knocked up onto the hood 1, the bag unit 22 is pivoted forward about the pivot fulcrum O1 by receiving the pressure. As a consequence of this pivoting, the third bag 28, which together with the inner surface of the first bag 23 and the inner surface of the second bag 24 define the substantially triangular-shaped space K1 in a surrounding manner and defines a side surface thereof, faces the pedestrian H.

As a result, the leg L or the like of the pedestrian H can come into abutment with the third bag 28 and get held by the third bag 28, and the third bag 28 can be curved forward at the same time. Thus, the leg L or the like can be housed and held in the space K1. As a consequence, the pedestrian H can be prevented from falling off the vehicle body from a front end thereof.

According to this embodiment, the bag unit 22 that is pivotable toward the front side of the vehicle body can prevent the pedestrian H from slipping off from the front of the vehicle body, and thus the pedestrian can be prevented from falling down on the ground and encountering a secondary collision. As a consequence, the pedestrian H can be appropriately protected.

Fifth Embodiment

Figure 7:
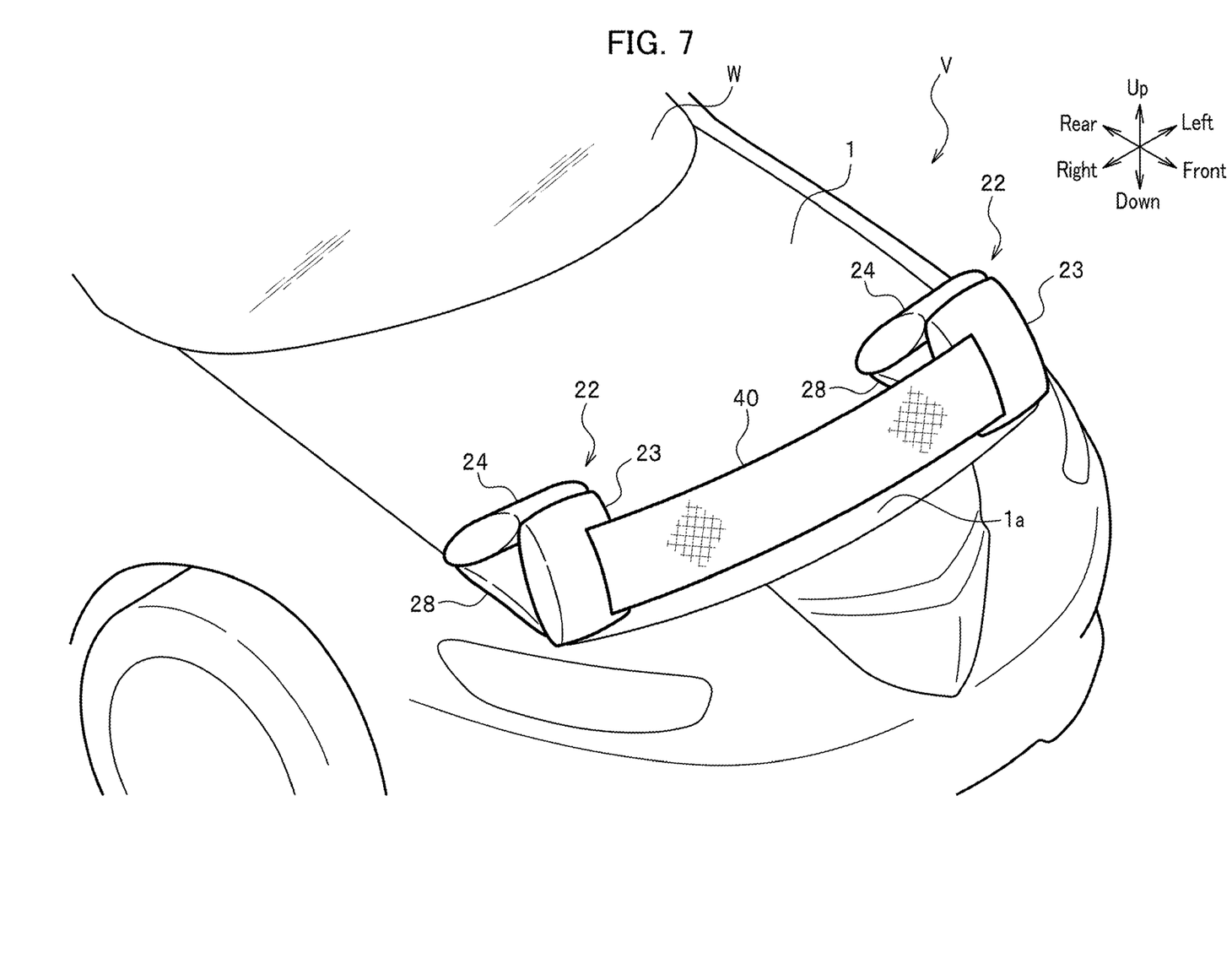
FIG. 7 is a perspective view of a front part of a vehicle body showing a state in which a bag unit of an air bag device according to a fifth embodiment of the present invention has been deployed.

An air bag device according to a fifth embodiment will be described with reference to FIG. 7. According to this embodiment, the bag units 22 are arranged on a front end of the hood 1 at the right and left sides thereof, and a screen member 40 is attached to and between the bag units 22.

Each bag unit 22 is provided with a third bag 28 at a bottom portion of the bag unit 22. The respective third bags 28 come into abutment with right and left portions of the hood 1 that are located at the front end thereof.

The screen member 40 is formed of a material similar to that of the bag unit 22, and has a rectangular shape. Two ends of the screen member 40 are attached to (sewn on) the front surfaces of the respective first bags 23, so that the screen member 40 is attached to and between the bag units 22.

In the above-described air bag device 20, a rear surface of the screen member 40 faces the rear of the vehicle body and is erected so as to be able to face the pedestrian having been knocked up onto the hood 1. Accordingly, when the pedestrian having been knocked up onto the hood 1 slips toward the front end portion 1a, a leg or the like of the pedestrian comes into abutment with the rear surface of the screen member 40. As a result, the pedestrian can be prevented from falling off in such a way that the pedestrian is caught by the screen member 40. In this way, it is possible to avoid the pedestrian from falling down on the ground and encountering a secondary collision. As a consequence, the pedestrian can be appropriately protected.

As the screen member 40 is erected on the front end portion 1a of the vehicle body, the screen member 40 can also function as a member to absorb the impact on the pedestrian when the pedestrian collides with the vehicle body. In this case, as the screen member 40 is supported by the right and left bag units 22, the right and left bag units 22 can appropriately absorb the deformation of the screen member 40.

In this embodiment, the screen member 40 is attached to and between the first bags 23. However, without limitations to the foregoing, the screen member 40 may be attached to and between the second bags 24 on the rear side. Alternatively, such screen members 40 may be attached to and between the first bags 23 as well as to and between the second bags 24 at the same time.

Sixth Embodiment

Figure 8:
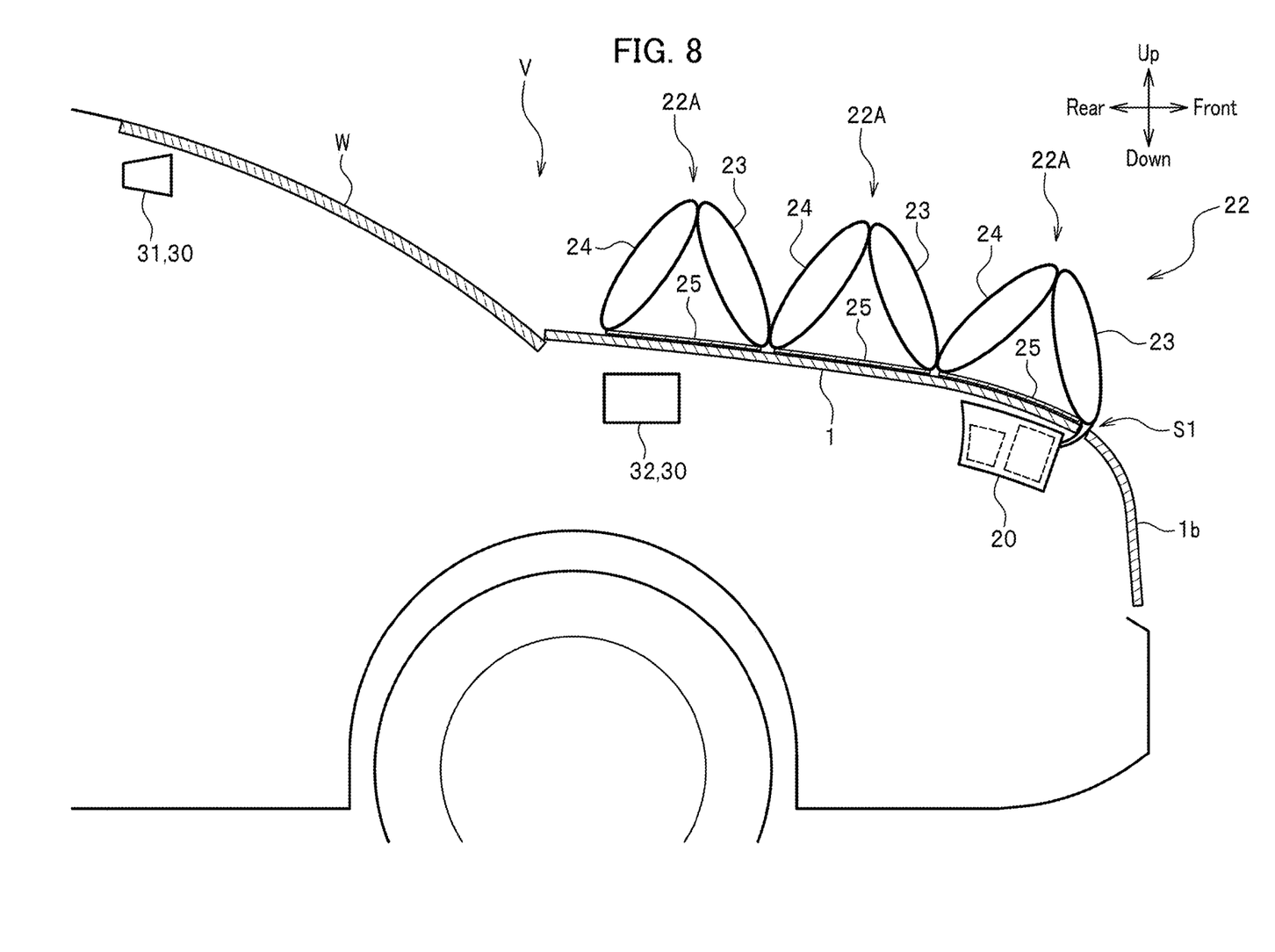
FIG. 8 is a partially cross-sectional side view showing a state in which a bag unit in an air bag device according to a sixth embodiment of the present invention has been deployed.

An air bag device of a sixth embodiment will be described with reference to FIG. 8. According to this embodiment, the bag unit 22 is formed by concatenating air bag modules 22A in the front-rear direction of the vehicle body. Each air bag module 22A includes the first bag 23, the second bag 24, and the tether 25.

The bag unit 22 includes three air bag modules 22A, i.e., front, middle and rear air bag modules 22A, connected in series in the front-rear direction of the vehicle body. The lower end portion of the second bag 24 of the front air bag module 22A is connected to the lower end portion of the first bag 23 of the middle air bag module 22A. The lower end portion of the second bag 24 of the middle air bag module 22A is connected to the lower end portion of the first bag 23 of the rear air bag module 22A. The internal spaces of the respective air bag modules 22A communicate with one another through the respective connection portions described above. With this structure, the gas flowing into the front air bag module 22A flows into the middle air bag module 22A and then into the rear air bag module 22A.

As the above-described air bag device 20 includes the three air bag modules 22A connected in series in the front-rear direction of the vehicle body, the impact on the pedestrian can be appropriately absorbed by the deformation of each of the air bag modules 22A. In addition, the concatenation of the three air bag module 22A makes it possible to catch or hold the pedestrian with a valley formed between any two of the mountain-like shapes. Thus, it is possible to avoid the pedestrian from falling down on the ground and encountering a secondary collision.

Seventh Embodiment

Figure 9:
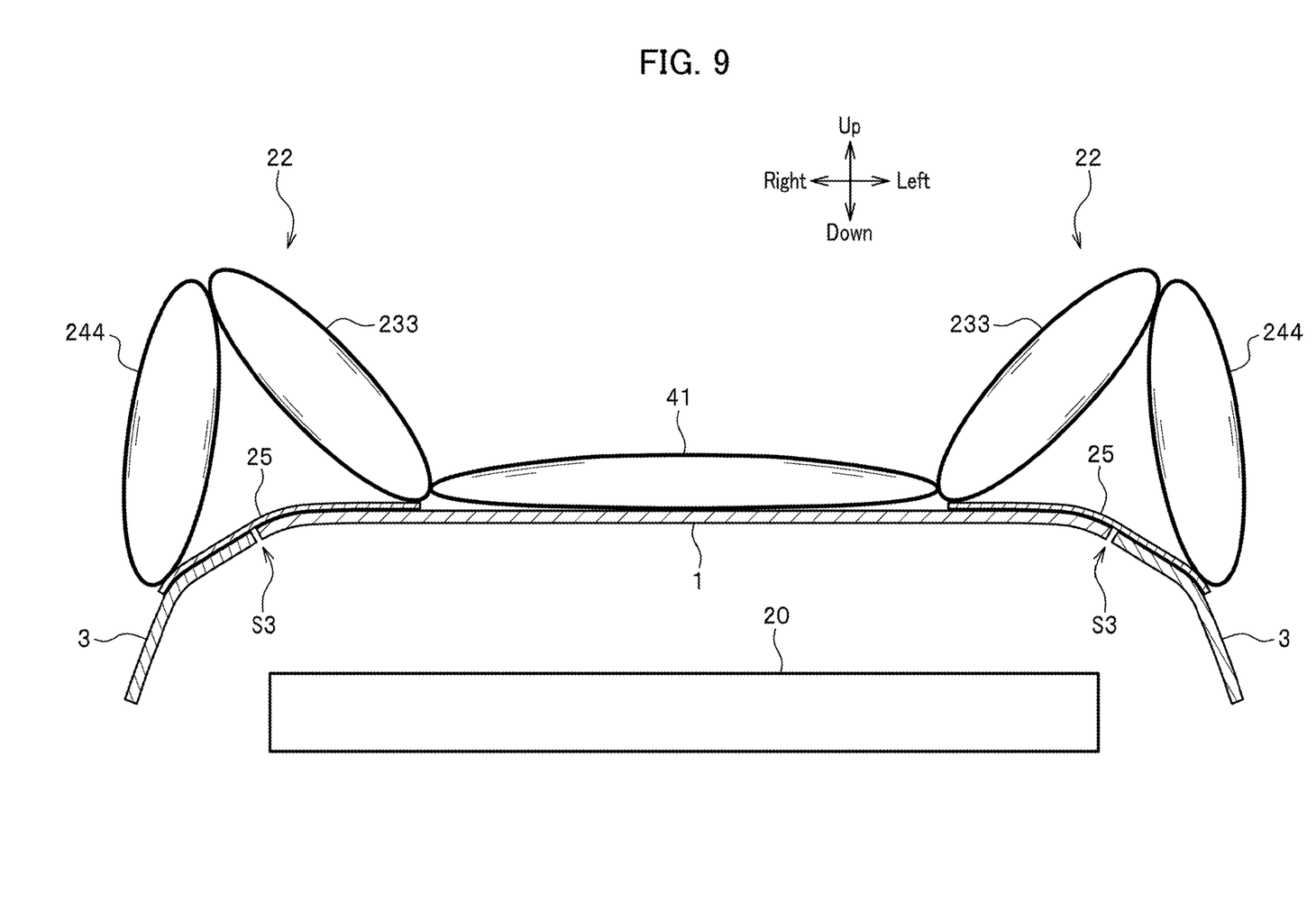
FIG. 9 is a partially cross-sectional side view showing a state in which a bag unit of an air bag device according to a seventh embodiment of the present invention has been deployed.

An air bag device of a seventh embodiment will be described with reference to FIG. 9. According to this embodiment, a pair of bag units 22 is deployed on right and left fenders 3, respectively, and the bag units 22 are connected to each other with a fourth bag 41 extending in the right-left direction.

Each of the right and left bag units 22 includes an inner bag 233 that corresponds to the first bag 23 (see FIG. 1 and the like), an outer bag 244 that corresponds to the second bag 24 (see FIG. 1 and the like), and the tether 25. Each of the right and left bag units 22 is arranged in such a way as to form a substantially triangular shape when viewed from a front side of the vehicle body by arranging the inner bag 233 and the outer bag 244 in the right-left direction of the vehicle body.

The inner bags 233 and the outer bags 244 extend in the front-rear direction along the respective fenders 3. Incidentally, each inner bag 233 and the corresponding outer bag 244 may be deployed by using the gap S1 (see FIG. 2) described earlier, or by using a gap S3 defined between the hood 1 and each fender 3 while using the above-mentioned gap S1 and a gap behind the hood 1 at the same time.

The fourth bag 41 connects between lower end portions of the right and left inner bags 233. The fourth bag 41 is configured to be deployed on the hood 1.

In the above-described air bag device, the pair of the bag units 22 are deployed on the right and left fenders 3, respectively. Accordingly, the right and left bag units 22 can restrain the pedestrian from being thrown out from the hood 1 beyond either of the fenders 3 and falling down on the ground. Moreover, this air bag device reliably protects the pedestrian because the right and left fenders 3, which are relatively hard portions, can be covered with the bag units 22.

In addition, the fourth bag 41 can appropriately absorb the impact on the pedestrian having been knocked up onto the hood 1.

While certain embodiments of the air bag device have been described above in detail with reference to the drawings, it is to be understood that the present invention is not limited only to these embodiments but can be modified as appropriate within the range not departing from the scope of the invention.

For example, according to the embodiments, the first bag 23 and the second bag 24 have the same major axis (a total length) and the same minor axis (a thickness). However, without limitations to the foregoing, the first bag 23 and the second bag 24 may have different total lengths and different thicknesses relative to each other as shown in FIG. 10, for instance.

Figure 10:
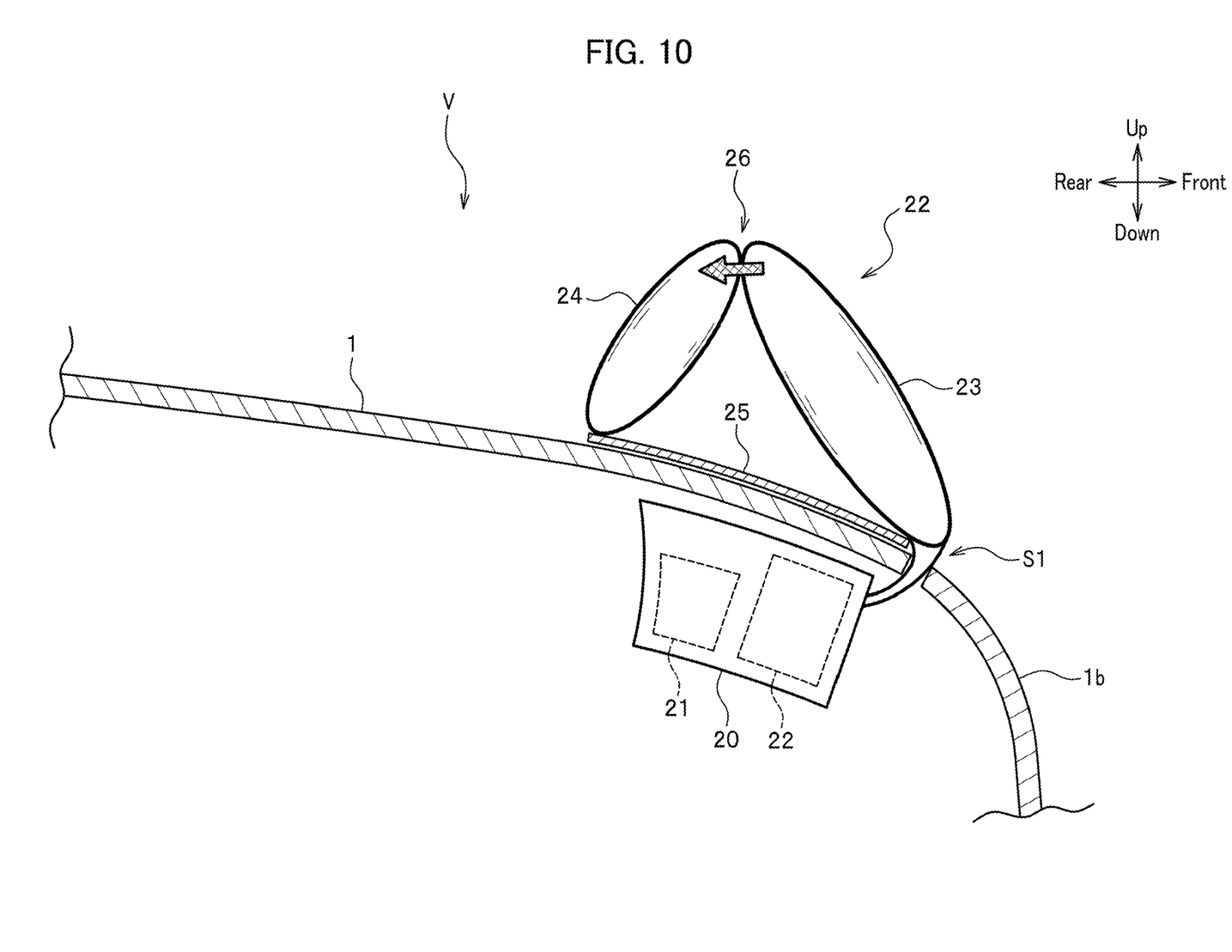
FIG. 10 is an enlarged partially cross-sectional front view showing a state in which a bag unit in an air bag device according to a modified example of the present invention has been deployed.

In the bag unit 22 of FIG. 10, the total length of the first bag 23 is set larger than the total length of the second bag 24 and the thickness of the first bag 23 is set larger than the thickness of the second bag 24. However, the aforementioned dimensional configurations may be inverted instead.

When two or more inflators 21 are provided, the amount of the gas to be ejected may vary among the inflators 21.

The camera 31 is used as the detection device. Without limitation to the foregoing, pedestrians may be detected by using a radar device instead.

The present invention is applicable to a wide range of vehicles each provided with an energy storage, examples of which include hybrid vehicles, electric vehicles, fuel-cell vehicles, and the like.

What is claimed is:

1. An air bag device comprising:
an inflator; and
a bag unit configured to be deployed on a front part of a vehicle body with a gas supplied from the inflator,
wherein the bag unit comprises a first bag, a second bag, and a connector which are connected to one another to form an annular configuration,
wherein the bag unit is configured to be deployed on a hood of the vehicle body or on a right or left fender of the vehicle body through a gap defined between a front end portion of the hood and a grill of the vehicle body,
wherein the connector directly connects between a lower end portion of the first bag and a lower end portion of the second bag, and
wherein, when the bag unit is deployed, the first bag and the second bag are erected on the vehicle body such that the first bag, the second bag, and the connector of the bag unit form a substantially triangular shape as a whole and the connector serves as a bottom portion of the substantially triangular shape and is capable of coming into abutment with the hood or the right or left fender.

2. The air bag device according to claim 1,
wherein the connector is a tether.

3. The air bag device according to claim 1,
wherein the connector is a third bag into which the gas supplied from the inflator flows.

4. The air bag device according to claim 1,
wherein the bag unit is arranged in such a way as to form the substantially triangular shape when viewed from a lateral side of the vehicle body by deploying the first bag on a front side of the vehicle body and deploying the second bag on a rear side of the first bag, and
wherein the bag unit is pivotable about a lower end portion of the first bag toward a front of the vehicle body.

5. The air bag device according to claim 1,
wherein the air bag device comprises a pair of the bag units deployed on the vehicle body with an interval therebetween in a right-left direction of the vehicle body, and
wherein a screen member is attached to and between the deployed pair of the bag units to prevent a protection target on an upper surface of the vehicle body from falling off from a front end thereof.

6. The air bag device according to claim 1,
wherein the air bag device comprises a plurality of the bag units connected in series in a front-rear direction of the vehicle body in such a way that a lower end portion of the second bag of a first one of the plurality of the bag units is connected to a lower end portion of the first bag of a next consecutive one of the plurality of the bag units.

7. The air bag device according to claim 1,
wherein the air bag device comprises a pair of the bag units configured to be deployed on the right and left fenders of the vehicle body in such a way that the first bag and the second bag of each of the pair of the bag units are arranged in a right-left direction of the vehicle body to form the substantially triangular shape when viewed from a front side of the vehicle body.

8. The air bag device according to claim 7, further comprising:
a fourth bag configured to be deployed on the hood of the vehicle body to extend in the right-left direction and connect between the pair of the bag units deployed on the right and left fenders.

9. The air bag device according to claim 5,
wherein a seam serving as a starting point of a crease corresponding to a vertex of the substantially triangular shape is formed between the first bag and the second bag.

10. The air bag device according to claim 1, further comprising:
a detection device configured to detect a situation in front of the vehicle body; and
a controller configured to predict a collision of a protection target with the vehicle body and to activate the inflator on the basis of the situation detected by the detection device.

* * * * *